May 1, 1962 H. HACHMANN 3,032,119
WIND POWER PLANT

Filed May 26, 1959 2 Sheets-Sheet 1

May 1, 1962   H. HACHMANN   3,032,119
WIND POWER PLANT

Filed May 26, 1959   2 Sheets-Sheet 2

United States Patent Office 3,032,119
Patented May 1, 1962

3,032,119
WIND POWER PLANT
Hans Hachmann, Tennant Creek, Northern
Territory, Australia
Filed May 26, 1959, Ser. No. 815,928
Claims priority, application Australia May 26, 1958
1 Claim. (Cl. 170—38)

This invention relates to an improved wind power plant.

One of the problems associated with the generation of power from the wind is to be able to produce plants of sufficient scale to allow generation of sufficient power to make this an economic possibility.

Windmills of various types and of relatively large capacity have been proposed, these taking the form of a wheel with a series of blades or following air foil or propeller construction, and of course in some cases relating to rotors of the "Fletner" or similar type, mounted on trucks, movement of which affected the generation of the power.

There is little doubt that a large scale windwheel could be the solution to the problem but the construction of such a windwheel itself offers difficulties and with a view to overcoming these the present invention has been devised.

Briefly the invention consists in the use of a windwheel mounted on a rotatable tower or rotatable means to allow the wheel to be faced into the wind, together with control means to effect such directional positioning, the windwheel comprising an annular rim on which are mounted series of blades arranged at different depths along the plane of the wheel, the arrangement of the blades being such that the wind gives up its energy to all of the sets of blades, the sets of blades being staggered in their relationship to the wind direction so as not to be blanketed, duplication of the wheels in an axial plane being continued as required.

The actual construction of the invention can be varied, but to enable it to be fully understood, an embodiment thereof will now be described with reference to the accompanying drawings in which.

Figure 1:
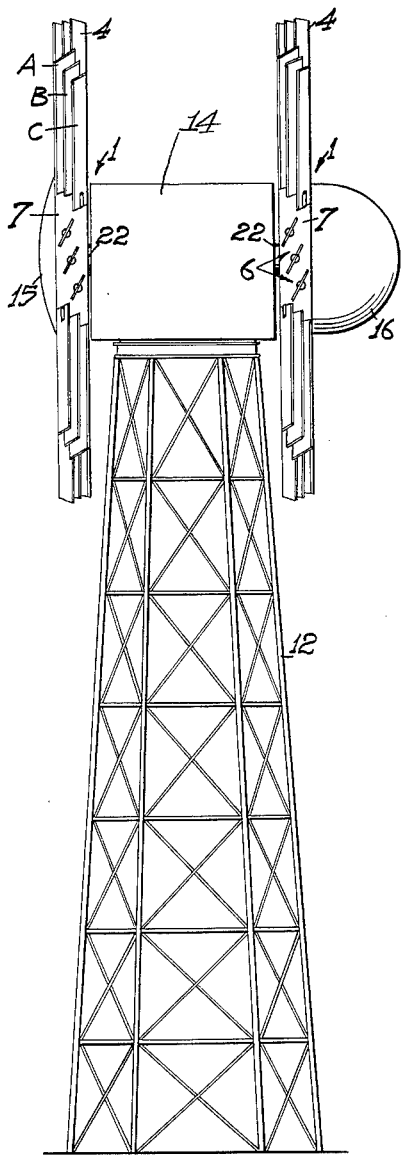
FIG. 1 is a side elevation of the embodiment of the plant.
Figure 2:
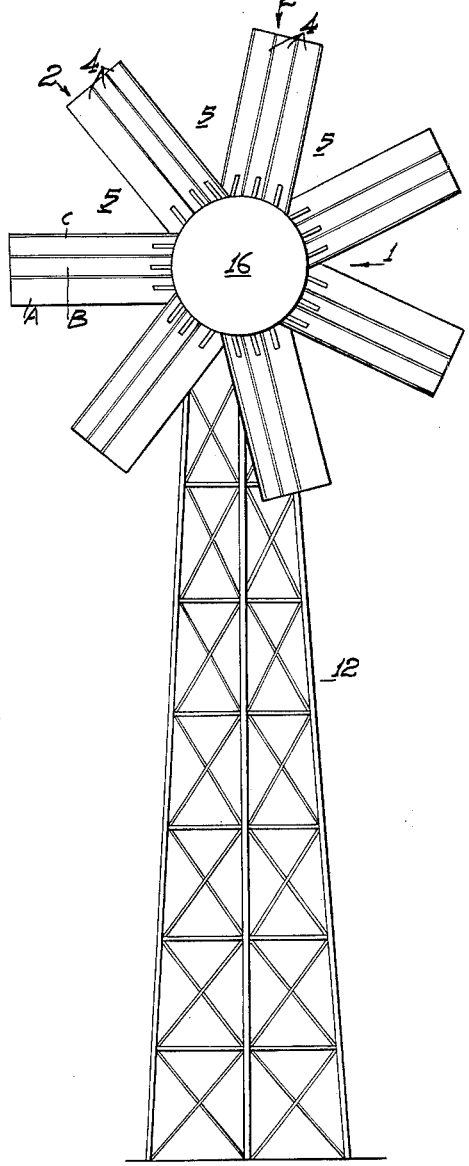
FIG. 2 is a front elevation of same.

A series of wheels 1 are mounted to revolve in any suitable manner, each wheel having sets 2 of blades 4 apart a sufficient distance so as to leave gaps 5 between them for a free flow of wind therebetween, each of the sets 2 of blades 4 being comprised of three blades A, B and C placed one behind the other with a gap 6 therebetween and placed out of alignment with regard to the wind direction, the first blade A projecting out from an annular rim 7 but having its axis 8 offset somewhat from the rotational axis 9 of the wheel, the next blade B having its axis coincident with the rotational axis 9 of the wheel while the third blade C has its axis 10 offset in the opposite direction in the same manner as the first blade.

Where three blades form a set 2 as described it is possible for instance to utilize three such sets around a rim 7 and as a typical example the annular rim might have a diameter of forty-five feet while each blade of each set 2 has a length of perhaps sixty feet, this relationship of allowing the angle of the blade to remain practically constant because the blades do not continue sufficiently closely to the axis of the hub to cause interference with the flow of the wind due to incorrect or too steep an angle which would be necessary where the blades continue in further.

Two such compounded windwheels could be supported on a shaft as shown, one in front of a tower 12 and the other to the rear of the tower, but the tower 12 itself has a head 14 which can rotate about a vertical axis to face the windwheels 1 into the wind, rotation of the head 14 being effected by any means such as an electric motor under control of a small monitor wind vane.

The actual generators or the like driven by the shaft of the windwheels 1 can be varied but as rotational speed of the wheel will be relatively slow it will be desirable to gear the generators up.

The generators can be carried in the housing 15. In this regard it may also be mentioned that a series of generators may prove more beneficial than a single generator, the generators being arranged to come into effect in accordance with the strength of the wind so that a single generator may absorb the power of the wheel at low speed of the wind but as the strength increases so more generators can be brought in to ensure correct power absorption.

The blades themselves feather to allow correct angle control in the manner of an aircraft adjustable propeller, and the control of the feathering can be by means of motors or by mechanical means which will allow setting of the blade angle to ensure maximum thrust from any given wind and also to allow the blades to be pulled out of operation in the case of stronger winds. Such devices are well known in aircraft propeller construction and need no detailed explanation.

It will be realised that an effective unit results which is of sufficient size to allow large scale production of electricity from the wind and which will have all the necessary control to allow selection of variable conditions, the mechanism being relatively simple because of the possibility of utilising standard blades for each of the sets so that it is merely a duplication of a blade structure supported in suitable control means.

The shape of the hubs 15 and 16 of the wheels 1 deflect the wind, which would otherwise strike them and do no useful work, against the blades of the sets 2 to add to the power generated.

Figure 3:
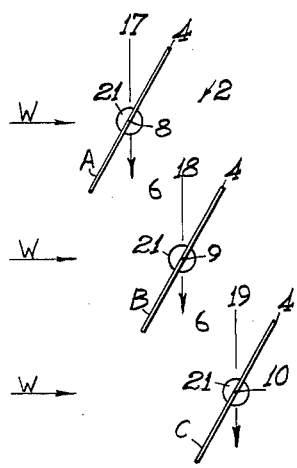
FIG. 3 is a schematic end view of one set of blades.
Figure 4:
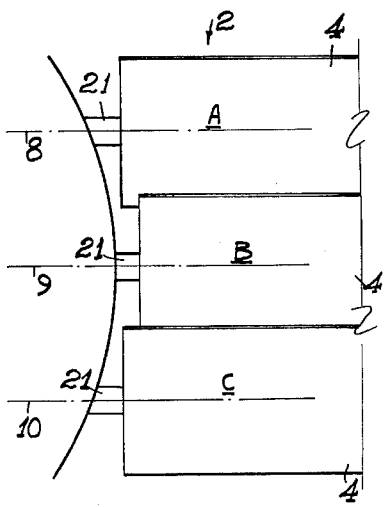
FIG. 4 is a schematic side view of the same blades.

With regard to the placing of the blades A, B and C of the sets 2: it will be noted that the rear blade C is so disposed that the wind, indicated by the arrows W in FIG. 3, passing through the wheel strikes this in a relatively unobstructed manner, the middle blade B being similarly free to receive the wind from the front and also the blade A so that all three blades therefore can give their most effective thrust. The axes on which the blades A, B and C are positioned in the direction of rotation are designated 17, 18 and 19, this arrangement ensuring that the wind spillage behind the blades is such that it does not obstruct the following blades which is the case where the blades are not laterally displaced.

The blades are therefore arranged in sets having parallel axes 8, 9 and 10 along the blades, but these axes are displaced laterally in the planes 17, 18 and 19, the foremost blade in the direction of travel thus being the furthest back from the windward side of the wheel as seen particularly in FIG. 3, each succeeding blade being displaced further forward towards the windward side of the wheel.

The blades are flat and rectangular and are mounted on shafts 21 which can be rotated to vary the pitch.

The main shaft on which the wheels are mounted is designated 22.

What I claim is:

A wind power plant comprising a main shaft, a plurality of windwheels spaced apart on said main shaft, each said windwheel comprising a series of elongated rectangular blades extending outwardly from the said main shaft, each series in turn comprising a plurality of similar blades, a shaft on each blade projecting from the inner end of said blade, a hub on said main shaft for each wind wheel supporting said shafts, said shafts of each series having their axes parallel to each other along the blade but the blades of each series having their axes displaced both laterally and in a direction at right angles to a plane coincident with the said main shaft with the foremost moving blade of each set in the rear plane with respect to the windward side of the wheel and each succeeding blade displaced further towards the windward side, a housing supporting the said main shaft, and a tower supporting the said housing.

References Cited in the file of this patent

UNITED STATES PATENTS

| | | |
|---|---|---|
| 147,647 | Kauffmann | Feb. 17, 1874 |
| 224,289 | Haskins | Feb. 10, 1880 |
| 512,164 | Dalstrom | Jan. 2, 1894 |
| 936,508 | Amnelius | Oct. 12, 1909 |
| 1,015,505 | Moon et al. | Jan. 23, 1912 |
| 1,142,502 | Donnelly | June 8, 1915 |
| 1,463,441 | Pike | July 31, 1923 |
| 1,649,057 | Bunkenburg | Nov. 15, 1927 |

FOREIGN PATENTS

| | | |
|---|---|---|
| 423,766 | France | Feb. 23, 1911 |